(12) United States Patent
Rupp

(10) Patent No.: US 12,709,238 B2
(45) Date of Patent: Aug. 18, 2026

(54) GARNISH ASSEMBLY FOR FLUID MANAGEMENT ON A VEHICLE

(71) Applicant: Honda Motor Co., Ltd., Tokyo (JP)

(72) Inventor: Timothy J. Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 399 days.

(21) Appl. No.: 18/360,246

(22) Filed: Jul. 27, 2023

(65) Prior Publication Data

US 2025/0033578 A1 Jan. 30, 2025

(51) Int. Cl.
*B60R 13/04* (2006.01)
*B60J 10/70* (2016.01)
*B60R 13/07* (2006.01)

(52) U.S. Cl.
CPC ............... *B60R 13/07* (2013.01); *B60J 10/70* (2016.02); *B60R 13/04* (2013.01)

(58) Field of Classification Search
CPC .......... B60R 13/04; B60R 13/07; B60J 10/70; B60J 10/7775
See application file for complete search history.

(56) References Cited

U.S. PATENT DOCUMENTS 4,541,664 A * 9/1985 Gallitzendorfer ....... B60R 13/07 296/213
5,044,684 A * 9/1991 Yada ........................ B60J 10/70 428/31
5,154,471 A * 10/1992 Mimura ................. B60J 10/265 296/93
5,167,893 A * 12/1992 Yada ........................ B60J 10/22 425/465
6,669,275 B2 12/2003 Frasher et al.
10,689,038 B2 * 6/2020 Ikeda .................. B62D 29/001
2005/0151395 A1 7/2005 Hoefer et al.
2014/0306480 A1 * 10/2014 Sasaki ...................... B60J 10/70 296/93
2015/0343888 A1 * 12/2015 Nakamichi .............. B60J 10/25 296/93
2016/0129771 A1 * 5/2016 Nakai ........................ B60J 1/02 296/93
2016/0355079 A1 * 12/2016 Rose ...................... B60J 1/2002
2019/0039553 A1 * 2/2019 Komura .............. G02F 1/13394
2024/0199127 A1 * 6/2024 Song ..................... B60R 13/025
2025/0033578 A1 * 1/2025 Rupp ...................... B60R 13/04

(Continued)

FOREIGN PATENT DOCUMENTS

DE 4116835 11/1992
DE 4132249 7/1994
DE 4308036 5/2000

(Continued)

*Primary Examiner* — Gregory A Blankenship
(74) *Attorney, Agent, or Firm* — Mark E. Duell; Rankin, Hill & Clark LLP

(57) ABSTRACT

An A-pillar garnish assembly for fluid management on a vehicle includes a windshield, an A-pillar structural member extending along a side edge of the windshield for supporting the windshield, and an A-pillar garnish member secured to the A-pillar structural member to define an open trough extending along the side edge of the windshield. The garnish member has at least one lateral fluid channel defined therein for directing fluid from the open trough into a closed pillar channel disposed behind the garnish member along the side edge of the windshield.

17 Claims, 5 Drawing Sheets

(56) References Cited

U.S. PATENT DOCUMENTS

2025/0263028 A1* 8/2025 Rupp .................... B62D 25/04

FOREIGN PATENT DOCUMENTS

| | | |
|---|---|---|
| DE | 19960143 | 6/2001 |
| DE | 102009032604 | 1/2011 |
| DE | 102018215147 | 3/2019 |
| DE | 102018208786 | 12/2019 |
| JP | 2009248773 | 10/2009 |
| JP | 4366052 | 11/2009 |
| JP | 2019137262 | 8/2019 |
| KR | 1998010798 | 5/1998 |
| KR | 100291061 | 6/2001 |
| WO | 2010130483 | 11/2010 |
| WO | 2010130486 | 11/2010 |

* cited by examiner

GARNISH ASSEMBLY FOR FLUID MANAGEMENT ON A VEHICLE

BACKGROUND

Currently, when applying a garnish to the A-pillar on a vehicle that seals to the front windshield, the garnish creates a trough-like shape to capture fluid (e.g., rain, washer fluid or the like) on the front windshield and push it to the roof of the vehicle. The purpose is to prevent the rain or washer fluid from spilling over the A-pillar and possibly hindering viewing through the side window on the vehicle. To control the fluid from spilling over the A-pillar, the trough-like shape created by the garnish with the windshield is currently has a large step or spacing, particularly for a dimension defining a width of the trough-like shape between the windshield and the garnish. The large step or spacing is required to that the trough can hold sufficient volume of fluid to prevent or reduce the likelihood of spillage over the A-pillar. This large step or spacing can undesirably limit styling for the vehicle as the garnish is required to be a particular size to create a large enough trough-like shape.

BRIEF DESCRIPTION

According to one aspect, an A-pillar garnish assembly for fluid management on a vehicle includes a windshield, an A-pillar structural member extending along a side edge of the windshield for supporting the windshield, and an A-pillar garnish member secured to the A-pillar structural member to define an open trough extending along the side edge of the windshield. The garnish member has at least one lateral fluid channel defined therein for directing fluid from the open trough into a closed pillar channel disposed behind the garnish member along the side edge of the windshield.

According to another aspect, a pillar garnish assembly for managing fluids on a vehicle windshield includes a pillar structural member extending along a side edge of the vehicle windshield and a garnish member secured to the structural member along the side edge of the vehicle windshield. The garnish member defines an open trough with an open side thereof facing laterally inwardly. The garnish member includes a base portion defining a base side of the open trough with at least one lateral fluid channel extending through the base portion to direct fluids received in the open trough therethrough.

According to a further aspect, an A-pillar garnish member for managing fluids from a vehicle windshield includes a mounting portion secured to a pillar structural member, an overlap portion extending from the mounting portion laterally and overlapping a front side of the vehicle windshield to define the open trough together with the windshield, and a base portion extending from the overlap portion toward the windshield to further define the open trough. At least one lateral fluid channel extends through the base portion to direct fluid out of the open trough.

DETAILED DESCRIPTION

It should, of course, be understood that the description and drawings herein are merely illustrative and that various modifications and changes can be made in the structures disclosed without departing from the present disclosure. Spatially relative terms may be used to describe an element and/or features relationship to another element(s) and/or feature(s) as, for example, illustrated in the figures. Moreover, any term of degree used herein, such as "substantially" and "approximately" means a reasonable amount of deviation of the modified word is contemplated such that the end result is not significantly changed. As used herein, the term "laterally" shall mean across the vehicle (i.e., in a direction extending from one side of the vehicle toward the other side).

Figures 1, 2:
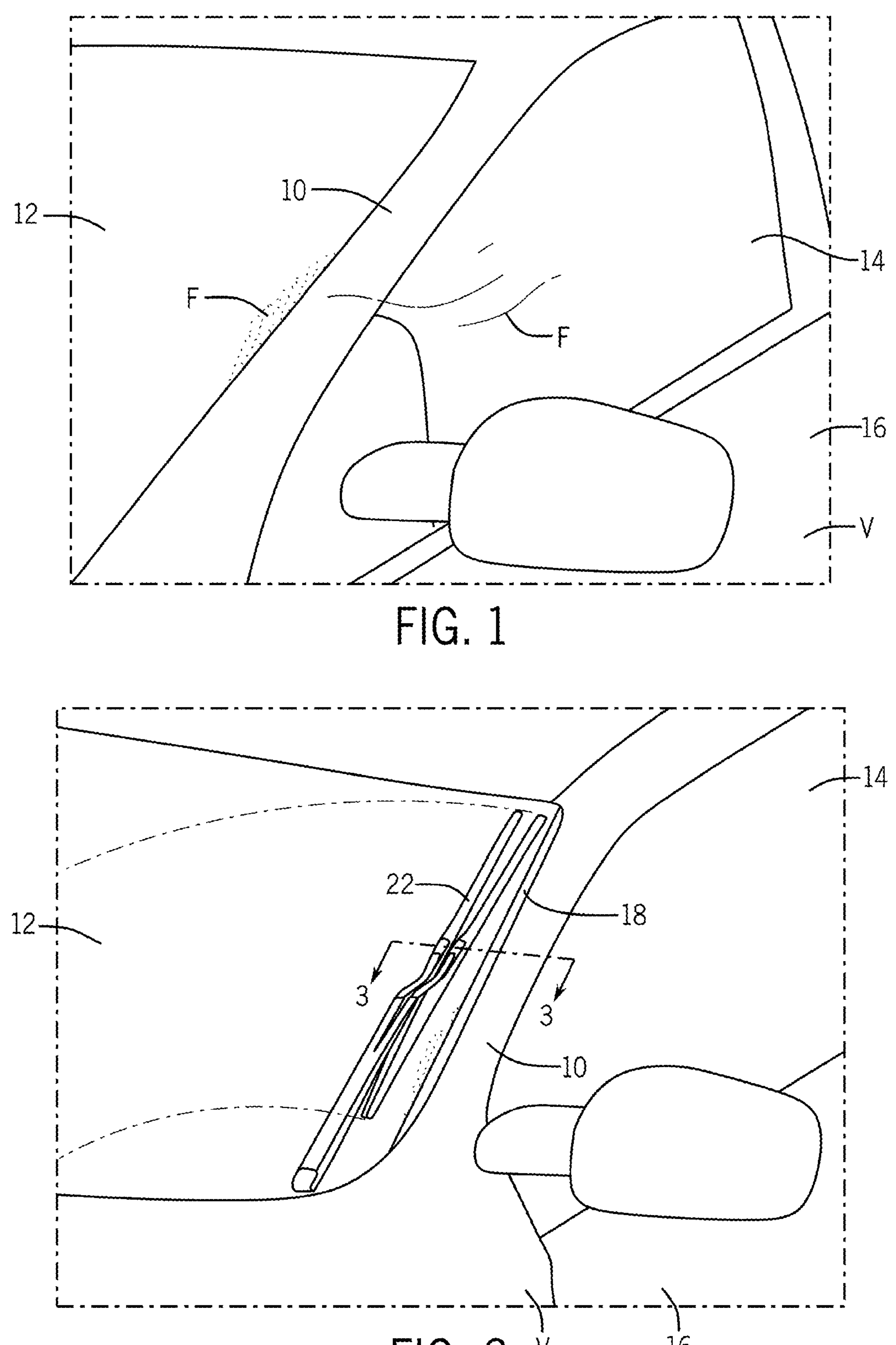
FIG. 1 is a partial perspective view of an A-pillar on a vehicle showing fluid from the windshield of the vehicle passing over the A-pillar and potentially hindering viewing through the side window of the vehicle.
FIG. 2 is a partial perspective view of an A-pillar garnish assembly including an A-pillar garnish member for fluid management of fluids passing from the windshield of the vehicle toward the A-pillar.

Referring now to the drawings, wherein like numerals refer to like parts throughout the several views, FIG. 1 illustrates a vehicle V having an A-pillar 10 disposed between a windshield 12 and side window 14 on a door 16 of the vehicle V. As shown, fluid F, such as water, windshield cleaner fluid, etc., can accumulate adjacent the A-pillar 10 on the windshield 12 and can pass over the A-pillar 10 so as to potentially hinder viewing through the side window 14. With additional reference to FIGS. 2 and 3, an A-pillar garnishment member 18 can be provided on the A-pillar 10 for managing fluids F on the windshield 12 of the vehicle V. In particular, and as will be described in more detail below, the garnish member 18 can define an open trough 20 extending along a side edge 12*a* of the windshield 12 so as to capture the fluid F from the windshield 12 and prevent the fluid F from passing over the A-pillar 10.

Figure 3:
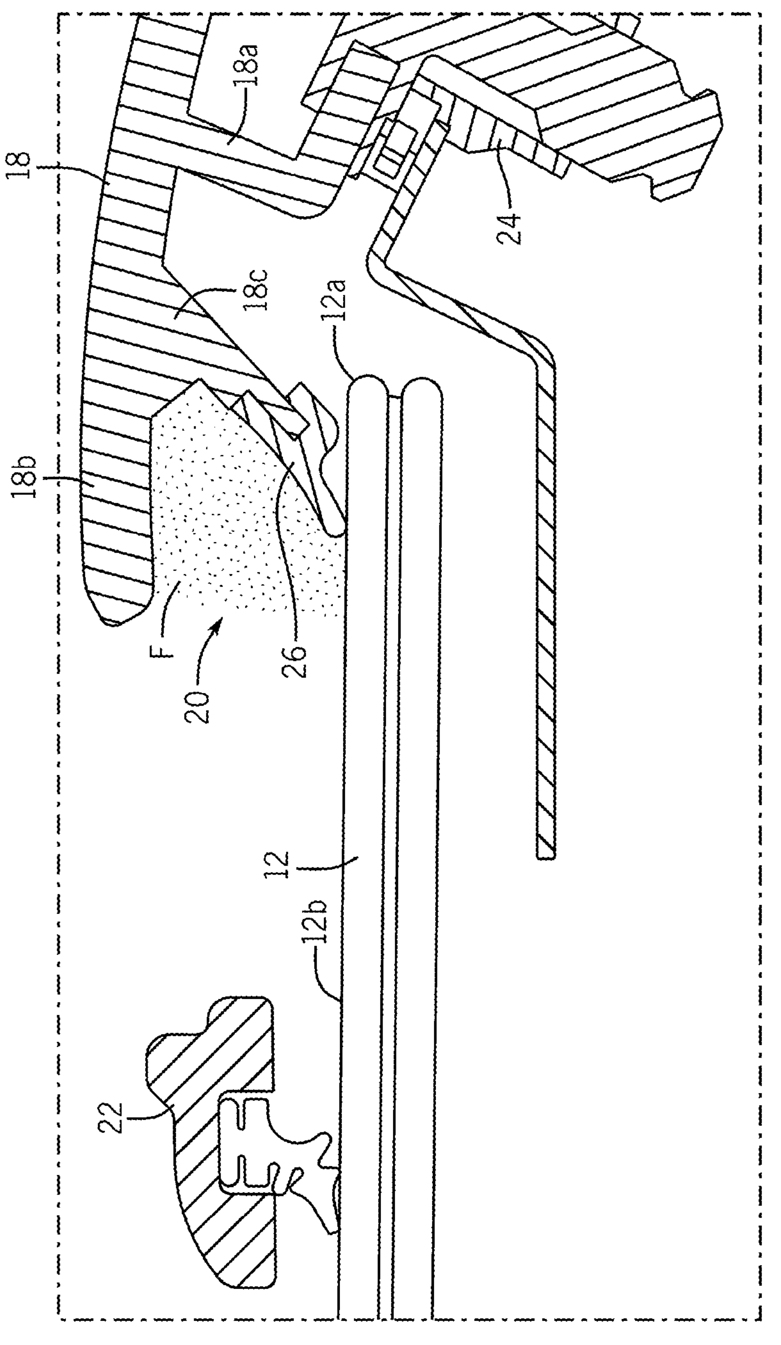
FIG. 3 is a cross section view taken along the line 3-3 of FIG. 2.

More specifically, as best shown in FIG. 3, the garnish member 18 can define the open trough 20 adjacent the side edge 12*a* of the windshield 12. Advantageously, the open trough 20 can additionally receive fluid F when a windshield wiper 22 pushes the fluid F toward the side edge 12*a* of the windshield 12. In particular, the garnish member 18 can include a mounting portion 18*a* for connecting to a structural member 24 of the A-pillar 10. The garnish member 18 can also include an overlap portion 18*b* extending from the mounting portion 18*a* laterally and overlapping the front side 12*b* of the windshield 12 to define the open trough 20 together with the windshield 12 as shown. Further, the garnish member 18 can include a base portion 18*c* extending from the overlap portion 18*b* toward the windshield 12 to further define the open trough 20. A seal 26 can be disposed on a distal end of the base portion 18*c* to seal the garnish member 18 to the windshield 12. A drawback of the garnish member 18 of FIGS. 2 and 3 is that styling and design is limited for the vehicle V due to the size of the garnish member 18 needing to be sufficient enough to create a large enough open trough 20.

Figure 4:
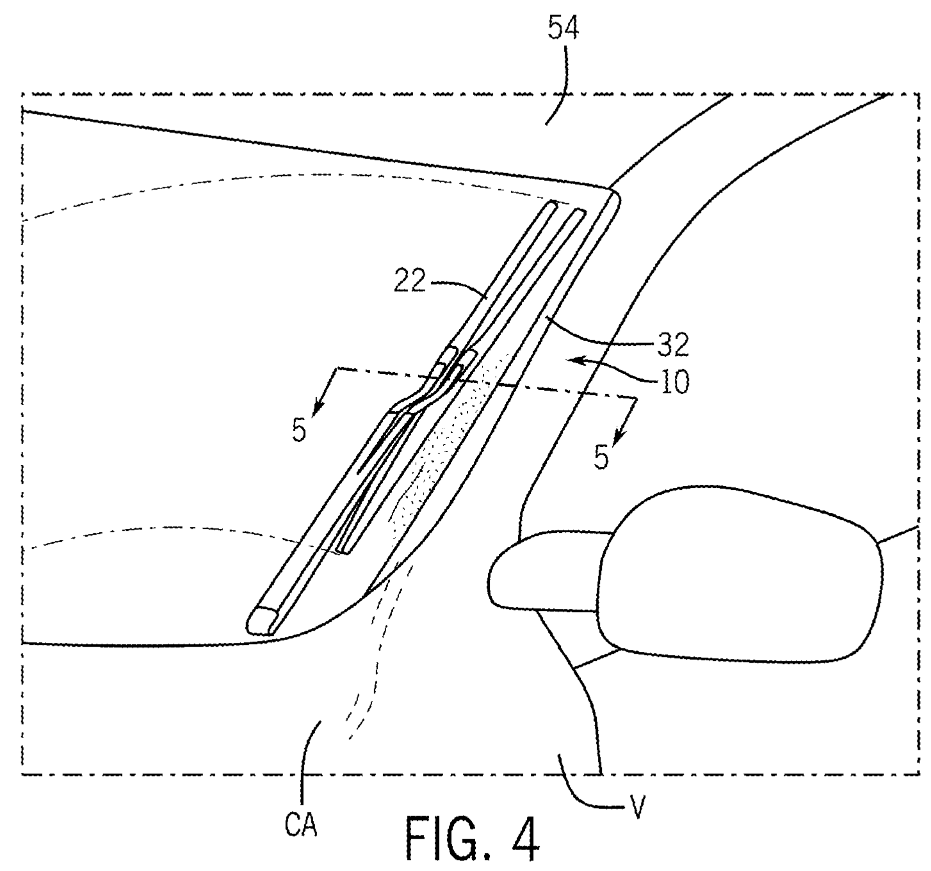
FIG. 4 is a partial perspective view of a vehicle having an A-pillar garnish assembly including an A-pillar garnish member with at least one lateral fluid channel for fluid management of fluids from the windshield of the vehicle according to an exemplary embodiment.
Figure 5:
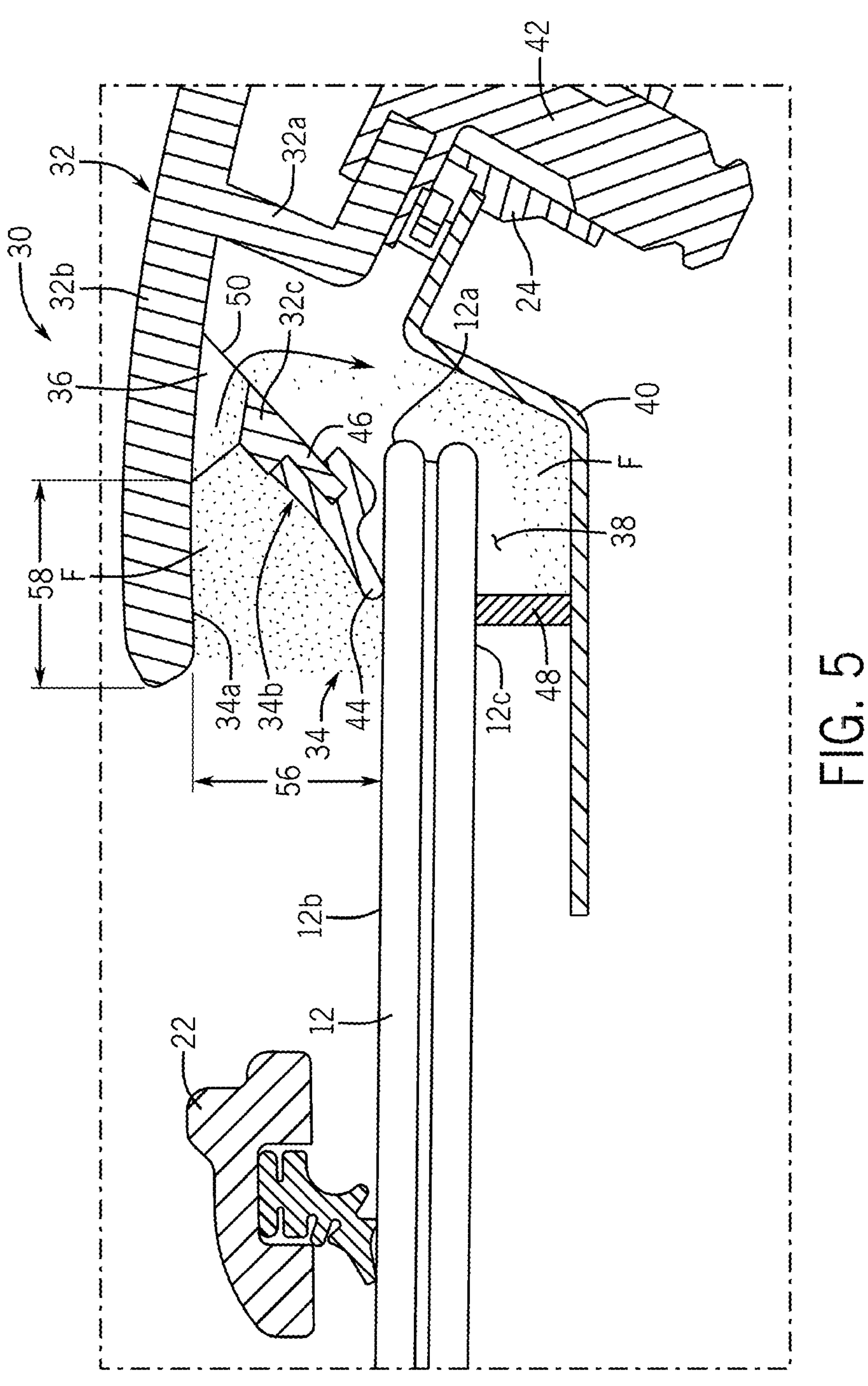
FIG. 5 is a cross section view of the A-pillar garnish assembly taken along the line 5-5 of FIG. 4 to show one of the at least one lateral fluid channel defined therein for directing fluid according to an exemplary embodiment.

With reference now to FIGS. 4 and 5, an A-pillar garnish assembly 30 is illustrated for fluid management on the vehicle V. The garnish assembly 30 can include the windshield 12, a pillar structural member, such as the A-pillar structural member 24, and an A-pillar garnish member 32 for managing fluids F from the vehicle windshield 12. The structural member 24 can be the same as shown in FIG. 3. In particular, the structural member 24 can extend along the side edge 12*a* of the windshield 12 for supporting the windshield 12. The garnish member 32 is secured to the structural member 24 to define the open trough 34 extending along the side edge 12*a* of the windshield 12. As will be described in more detail below, the garnish member 32 has at least one lateral fluid channel 36 defined therein for directing fluid from the open trough 34 into a closed pillar channel 38 disposed behind the garnish member 32 along the side edge 12*a* of the windshield 12. The closed pillar channel 38 extends along substantially an entirety of the side edge 12*a* of the windshield 12. In one embodiment, as will be described in more detail below, the at least one lateral fluid channel can be a plurality of spaced apart lateral fluid channels. That is, the plurality of lateral fluid channels can be disposed along a substantial or entire length of the garnish member 32.

As best shown in FIG. 5, the garnish assembly 30 can additionally include a windshield mounting flange member 40 secured to the structural member 24 on which the windshield 12 is mounted. The closed pillar channel 38 can be at least partially defined by the windshield mounting flange member 40 and the garnish member 32. More particularly, in the illustrated embodiment, the closed pillar channel 38 can be defined by the garnish member 32, and particularly by the mounting portion 32*a* and the overlap portion 32*b* as shown in FIG. 5. The closed pillar channel 38 can extend along substantially an entirety of the side edge 12*a* of the windshield 12.

The garnish member 32 can include a mounting portion 32*a* secured to the structural member 24. In particular, as shown, a fastener 42 can secure the mounting portion 32*a* of the garnish member 32 to the structural member 24. The garnish member 32 can additionally include an overlap portion 32*b* and a base portion 32*c*. The overlap portion 32*b* extends from the mounting portion 32*a* laterally and overlapping the front side 12*b* of the windshield 12 to define the open trough 34 together with the windshield 12. The base portion 32*c* extends from the overlap portion 32*b* toward the windshield 12 to further define the open trough 34. The at least one fluid channel 36 extends through the base portion 32*c* from the open trough 34 to the closed pillar channel 38.

In particular, the overlap portion 32*b* defines one side 34*a* of the open trough 34 with the front surface 12*b* of the windshield 12 defining the other side of the open trough 34. The base portion 32*c* defines a base side 34*b* of the open trough 34 extending from the side 34*a* of the open trough 34 to the other side, i.e., the front surface 12*b* of the windshield 12, of the open trough 34. A seal 44 is disposed on a distal end 46 of the base portion 32*c* of the garnish member and sealing contact with the front surface 12*b* of the windshield 12. Accordingly, the seal 44 also defines the base side 34*b* of the open trough 34. Another seal 48 can be disposed between a rear side 12*c* of the windshield 12 and the mounting flange member 40. As shown, the at least one lateral fluid channel 36 can be disposed at a proximal end 50 of the base portion 32*c* of the garnish member 32 adjacent the overlap portion 32*b*.

Figures 6, 7:
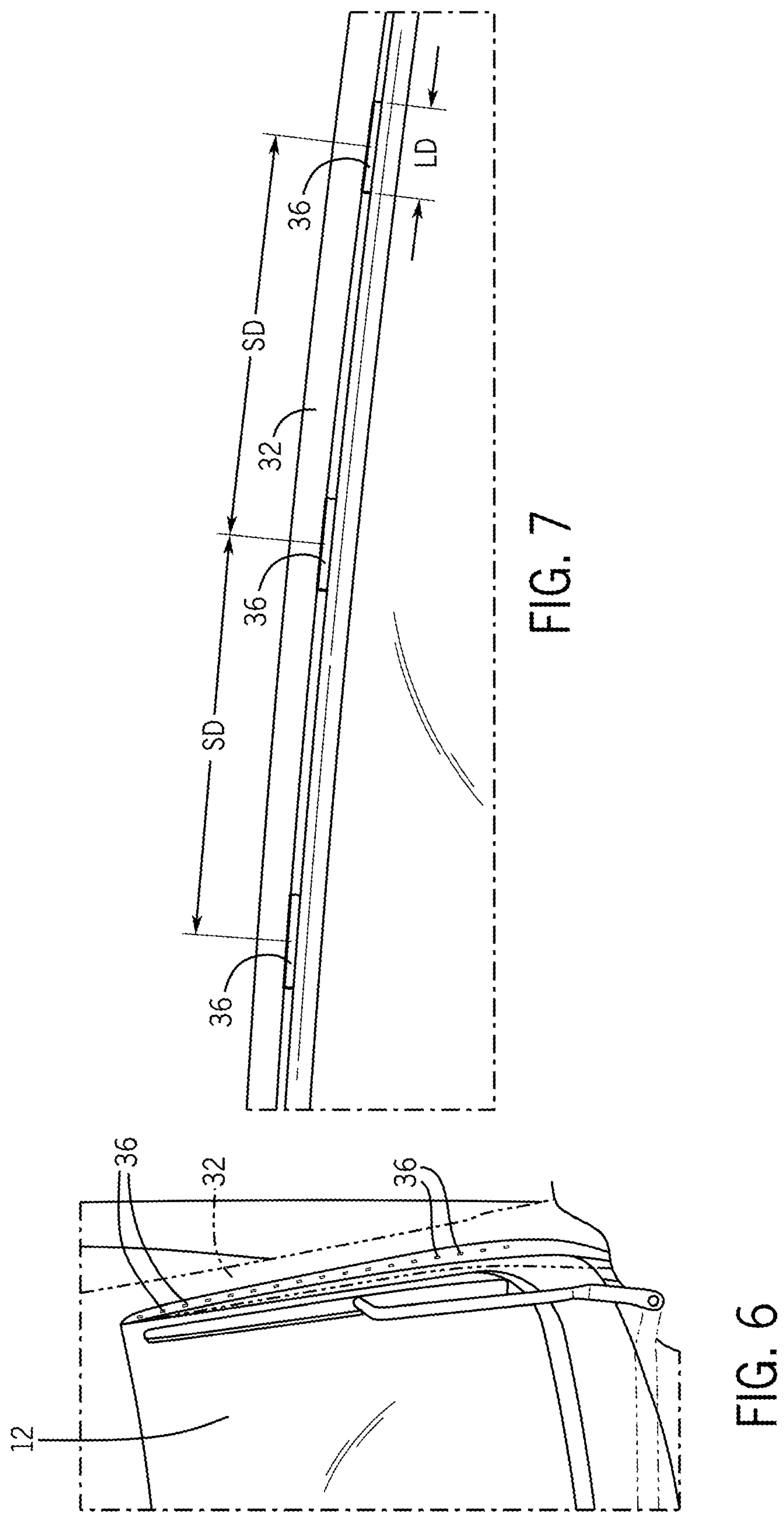
FIG. 6 is a schematic partial perspective view showing an exemplary embodiment wherein the at least one lateral fluid channel includes sixteen lateral fluid channels spaced apart along the A-pillar garnish member.
FIG. 7 is an enlarged schematic partial perspective view showing three of the lateral fluid channels from FIG. 6 to show exemplary spacing and size for the fluid channels according to one exemplary embodiment.

With further reference now to FIGS. 6 and 7, a particular embodiment is schematically illustrated wherein the at least one lateral fluid channel 36 includes sixteen (16) lateral fluid channels 36 disposed along substantially an entire length of the garnish member 32 (see FIG. 5). In particular, the lateral fluid channels 36 in FIG. 5 are equally spaced apart from one another along het length of the garnish member 32. Of course, it should be appreciated by those skilled in the art that any number of lateral fluid channels 36 can be used including less than 16 or more than 16. Also, it should be appreciated that equal spacing between fluid channels 36 is not required and varied spacing could be used (e.g., progressively increasing or decreasing spacing along the length of the garnish member 32 or from a central location of the garnish member 32 toward ends of the garnish member 32). In one example embodiment, with reference to FIG. 7, a spacing dimension SD between midpoints of adjacent lateral fluid channels 36 can be 43 mm and a length dimension LD for each lateral fluid channel 36 can be 10 mm. Of course, it should be appreciated that other dimensions, both between the midpoints of adjacent lateral fluid channels 36 and for the length of each lateral fluid channel 36, can be used.

In use, fluid from the windshield 12 is collected in the open trough 34. This can include fluid F pushed into the open trough 34 by the windshield wiper 22. Fluid F accumulating in the open trough 34 can then pass through the at least one lateral fluid channel 36 (e.g., 16 lateral fluid channels in FIGS. 6 and 7) into the closed pillar channel 38. This enables a smaller volume to be required for management by the open trough 34. More particularly, a lesser volume of fluid F can be accommodated in the open trough 34 due to the inclusion of the at least one lateral fluid channel 36 which serves to direct fluid F out of the open trough 34 and into the closed pillar channel 38. In one exemplary embodiment, the closed pillar channel 38 can be fluidly connected to the cowl area CA of the vehicle V and/or can be directed to roof 54 of the vehicle V. Advantageously, this allows for dimensions 56 and 58 to be reduced and/or optimized to allow aesthetic improvement of the garnish assembly 30 on the vehicle V and of the vehicle overall.

It will be appreciated that various of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

The invention claimed is:

1. An A-pillar garnish assembly for fluid management on a vehicle, comprising:

a windshield;

an A-pillar structural member extending along a side edge of the windshield for supporting the windshield; and an A-pillar garnish member secured to the A-pillar structural member to define an open trough extending along the side edge of the windshield, the garnish member including an overlap portion defining one side of the open trough with a front surface of the windshield defining another side of the open trough, and a base portion extending from the overlap portion toward the windshield to define a base side of the open trough, the garnish member having at least one lateral fluid channel extending through the base portion at a proximal end of the base portion adjacent the overlap portion for directing fluid from the open trough into a closed pillar channel disposed behind the garnish member along the side edge of the windshield.

2. The A-pillar garnish assembly of claim 1 wherein the closed pillar channel extending along substantially an entirety of the side edge of the windshield.

3. The A-pillar garnish assembly of claim 2 wherein the at least one lateral fluid channel is a plurality of spaced apart lateral fluid channels.

4. The A-pillar garnish assembly of claim 1 wherein the overlap portion overlaps the front surface of the windshield by a lateral distance sufficient to direct fluid from the windshield into the open trough.

5. The A-pillar garnish assembly of claim 1 wherein each lateral fluid channel extends through the base portion of the garnish member at an oblique angle relative to the front surface of the windshield.

6. The A-pillar garnish assembly of claim 5 wherein a seal is disposed on a distal end of the base portion in sealing contact with the front surface of the windshield.

7. The A-pillar garnish assembly of claim 5 further including a windshield mounting flange member secured to the A-pillar structural member on which the windshield is mounted, the closed pillar channel partially defined by the windshield mounting flange member.

8. The A-pillar garnish assembly of claim 7 wherein a seal is disposed between a rear side of the windshield and the windshield mounting flange member.

9. The A-pillar garnish assembly of claim 7 wherein the closed pillar channel is further defined by the garnish member.

10. The A-pillar garnish assembly of claim 1 further including a windshield mounting flange member secured to the A-pillar structural member on which the windshield is mounted, the closed pillar channel defined by the windshield mounting flange member and the garnish member.

11. The A-pillar garnish assembly of claim 1 wherein the garnish member further includes a mounting portion secured to the A-pilar structural member, and wherein the mounting portion, the overlap portion, and the base portion are integrally formed as a single molded component so that the at least one lateral fluid channel forms an enclosed conduit within the garnish member.

12. The A-pillar garnish assembly of claim 3 wherein the plurality of spaced apart lateral fluid channels are disposed at the proximal end of the base portion adjacent the overlap portion and are configured to promote even fluid distribution into the closed pillar channel.

13. A pillar garnish assembly for managing fluids on a vehicle windshield, comprising:

a pillar structural member extending along a side edge of the vehicle windshield; and a garnish member secured to the structural member along the side edge of the vehicle windshield, the garnish member defining an open trough with an open side thereof facing laterally inwardly, the garnish member including a base portion defining a base side of the open trough with at least one lateral fluid channel extending through the base portion to direct fluids received in the open trough therethrough, wherein the base portion has at least one lateral fluid channel extending obliquely therethrough to direct fluid received in the open trough into a closed pillar channel disposed behind the garnish member, whereby discharge of the collected fluid into the closed pillar channel enables a reduced trough size and greater design flexibility for the garnish member, wherein the garnish member further includes a mounting portion secured to the pillar structural member and an overlap portion extending from the mounting portion laterally and overlapping a front side of the vehicle windshield to define the open trough together with the windshield, and wherein the at least one lateral fluid channel is disposed at a proximal end of the base portion adjacent the overlap portion.

14. The pillar garnish assembly of claim 13 wherein the garnish member also defines a closed pillar channel disposed behind the garnish member along the side edge of the vehicle windshield which is fluidly connected to the open trough by the at least one lateral fluid channel.

15. The pillar garnish assembly of claim 14 wherein the at least one lateral fluid channel is a plurality of spaced apart lateral fluid channels, and wherein the closed pillar channel extends along substantially an entirety of the side edge of the vehicle windshield.

16. An A-pillar garnish member for managing fluids from a vehicle windshield, comprising:

a mounting portion secured to a pillar structural member;

an overlap portion extending from the mounting portion laterally and overlapping a front side of the vehicle windshield to define an open trough together with the windshield; and a base portion extending from the overlap portion toward the windshield to further define the open trough, at least one lateral fluid channel extending through the base portion at a proximal end of the base portion adjacent the overlap portion to direct fluid out of the open trough.

17. The A-pillar garnish member of claim 16 wherein the at least one lateral fluid channel is a plurality of spaced apart lateral fluid channels extending along a substantial length of the base portion.

* * * * *